United States Patent
Yang et al.

(10) Patent No.: US 10,921,704 B2
(45) Date of Patent: Feb. 16, 2021

(54) METHOD FOR CONTROLLING PROJECTION CONTENT AND ELECTRONIC DEVICE

(71) Applicant: Wistron Corporation, New Taipei (TW)

(72) Inventors: Yi-Fang Yang, New Taipei (TW); Chien Huang, New Taipei (TW); Keng-Hsien Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/587,037

(22) Filed: Sep. 29, 2019

(65) Prior Publication Data
US 2021/0011367 A1    Jan. 14, 2021

(30) Foreign Application Priority Data
Jul. 11, 2019    (TW) .............................. 108124549 A

(51) Int. Cl.
*G03B 21/26*    (2006.01)
*G06F 3/042*    (2006.01)
*G06F 3/03*    (2006.01)

(52) U.S. Cl.
CPC ........... *G03B 21/26* (2013.01); *G06F 3/0304* (2013.01); *G06F 3/0425* (2013.01)

(58) Field of Classification Search
CPC ...... G03B 21/001; G03B 21/13; G03B 21/26; G03B 21/132; G03B 21/147; G03B 21/2053; G06F 3/011; G06F 3/0421; G06F 3/0304; G06F 3/0314; G06F 3/0425
See application file for complete search history.

(56) References Cited

U.S. PATENT DOCUMENTS

| | | | |
|---|---|---|---|
| 7,703,926 B2 | 4/2010 | Hong et al. | |
| 2007/0058140 A1* | 3/2007 | Kobayashi | H04N 9/3147 353/94 |
| 2007/0273838 A1 | 11/2007 | Hong et al. | |
| 2011/0012925 A1* | 1/2011 | Luo | H04N 9/3194 345/636 |
| 2014/0055354 A1 | 2/2014 | Hong et al. | |
| 2017/0031530 A1* | 2/2017 | Ikeda | H04N 9/3179 |
| 2017/0329458 A1* | 11/2017 | Kanemaru | G06F 3/0425 |

FOREIGN PATENT DOCUMENTS

| | | |
|---|---|---|
| TW | M300825 | 11/2006 |
| TW | 201409287 | 3/2014 |

OTHER PUBLICATIONS

"Office Action of Taiwan Counterpart Application", dated Jul. 8, 2020, p. 1-p. 11.

\* cited by examiner

*Primary Examiner* — Sultan Chowdhury
(74) *Attorney, Agent, or Firm* — JCIPRNET

(57) ABSTRACT

The disclosure provides a method for controlling a projection content and an electronic device. The method includes: controlling a projector to project a display content on a projection plane; obtaining a display range of the display content on the projection plane; detecting a light spot on the projection plane; and adjusting the display content based on a movement condition of the light spot with respect to the display range.

15 Claims, 8 Drawing Sheets

METHOD FOR CONTROLLING PROJECTION CONTENT AND ELECTRONIC DEVICE

CROSS-REFERENCE TO RELATED APPLICATION

This application claims the priority benefit of TAIWAN application serial no. 108124549, filed on Jul. 11, 2019. The entirety of the above-mentioned patent application is hereby incorporated by reference herein and made a part of this specification.

BACKGROUND

Technical Field

The disclosure relates to a projection technique, and more particularly to a method for controlling a projection content and an electronic device.

Description of Related Art

It is quite common for a user to use a computer device to control a projector to play slides during presentation. Therefore, many manufacturers have provided various novel products for improving the experience and operation mode of users during the presentation.

However, there are few products on the market that allow the users to perform marking operations such as marking on the projected presentation content in real time. Therefore, there is still a need for related research and development by persons skilled in the art.

SUMMARY

In view of this, the disclosure provides a method for controlling a projection content and an electronic device that can be used to solve the above technical problems.

The disclosure provides a method for controlling a projection content adapted for an electronic device, the method including: controlling a projector to project a display content on a projection plane; obtaining a display range of the display content on the projection plane; detecting a light spot on the projection plane, wherein the light spot is emitted by an indicator device to the projection plane, and the indicator device is paired with the electronic device; and adjusting the display content based on a movement condition of the light spot with respect to the display range.

The disclosure provides an electronic device associated with an indicator device. The electronic device includes a storage circuit and a processor. The storage circuit stores a plurality of modules. The processor is coupled to the storage circuit and accesses the plurality of modules to perform following steps: controlling a projector to project a display content on a projection plane; obtaining a display range of the display content on the projection plane; detecting a light spot on the projection plane, wherein the light spot is emitted by an indicator device to the projection plane, and the indicator device is paired with the electronic device; and adjusting the display content based on a movement condition of the light spot with respect to the display range.

Based on the above, the method for controlling the projection content and the electronic device proposed by the disclosure can adjust the display content according to the movement condition of the light spot after detecting the light spot projected by the indicator device onto the projection plane. In this way, the convenience and diversity for the user to control and adjust the projection content can be improved.

In order to make the aforementioned features and advantages of the disclosure comprehensible, embodiments accompanied with drawings are described in detail below.

DESCRIPTION OF THE EMBODIMENTS

Figure 1A:
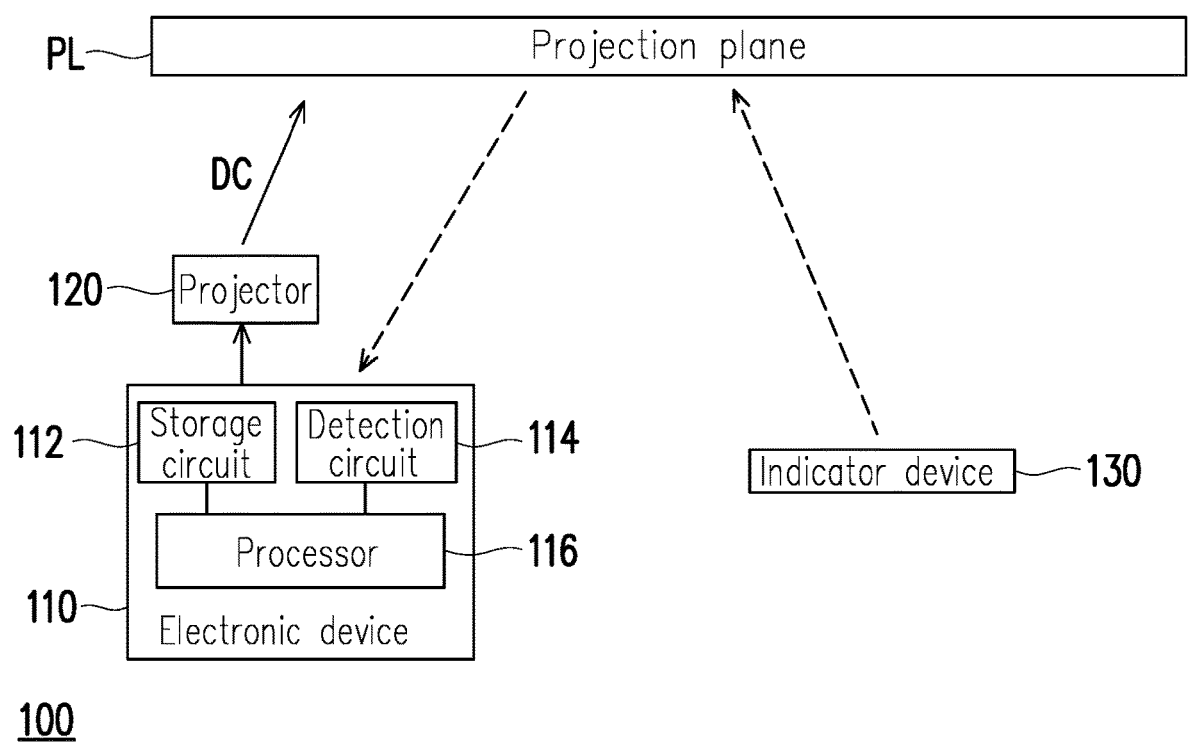
FIG. 1A is a schematic diagram of a projection content control system according to an embodiment of the disclosure.
Figure 1B:
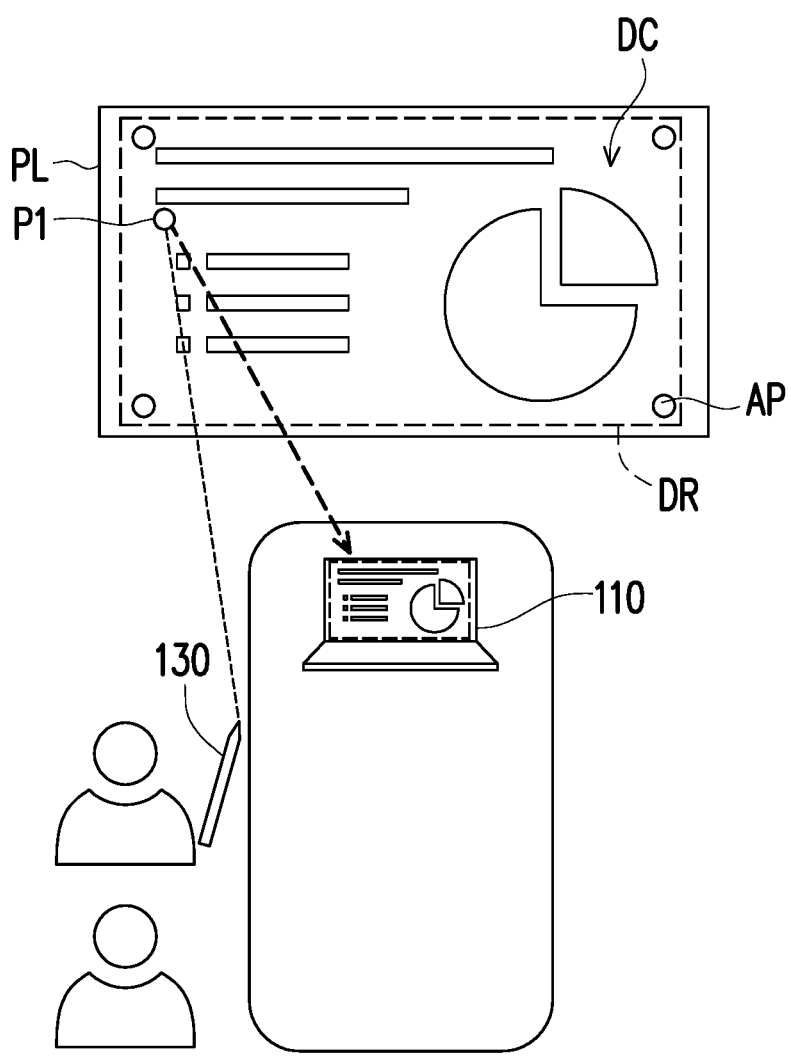
FIG. 1B is an application scenario diagram according to FIG. 1A.

Please refer to FIGS. 1A and 1B, wherein FIG. 1A is a schematic diagram of a projection content control system according to an embodiment of the disclosure, and FIG. 1B is an application scenario diagram according to FIG. 1A. As shown in FIGS. 1A and 1B, a system 100 includes an electronic device 110, a projector 120, and an indicator device 130. In various embodiments, the electronic device 110 is, for example, a personal computer, a smart phone, a tablet computer, or other similar computer devices, but the disclosure is not limited thereto. In the embodiment, the electronic device 110 may include a storage circuit 112, a detection circuit 114, and a processor 116. The storage circuit 112 is, for example, any type of fixed or removable random access memory (RAM), read-only memory (ROM), flash memory (Flash memory), a hard disk or other similar devices or a combination of these devices, and may be configured to record a plurality of codes or modules.

The detection circuit 114 is, for example, any camera having a charge coupled device (CCD) lens, a complementary metal oxide semiconductor transistor (CMOS) lens, or an infrared lens.

The processor 116 is coupled to the storage circuit 112 and the detection circuit 114, and may be a general-purpose processor, a special-purpose processor, a conventional processor, a digital signal processor, a plurality of microprocessors, one or more microprocessors combined with a digital signal processor core, a controller, a microcontroller, an application specific integrated circuit (ASIC), a field programmable gate array (FPGA), any other type of integrated circuit, state machine, advanced RISC machine (ARM) based processor and the like.

The projector 120 may be connected to the electronic device 110 through, for example, a high definition multimedia interface (HDMI) and be controlled by the electronic device 110 to project a display content DC (for example, a presentation content, a slide content, any file content, a screen currently displayed by the electronic device 110, or the like) onto a projection plane PL (for example, a curtain, a wall surface, or the like).

The indicator device 130 is, for example, a stylus or other devices capable of emitting visible/invisible light spots, and may be paired with the electronic device 110 through a communication module (for example, a Bluetooth module) to exchange data with the electronic device 110. In an embodiment, data transmission between the electronic device 110 and the indicator device 130 may be performed through the Bluetooth low energy (BLE) protocol to save power consumption of the indicator device 130, but it is not limited thereto.

Moreover, in an embodiment, one or more function buttons may be disposed on the indicator device 130 for the user to press in a specific manner (for example, single click, double click, long press, short press, and the like) to trigger specific functions. Relevant details will be described later.

In addition, in some embodiments, the indicator device 130 may further include a motion sensor, which may be configured to sense motion data of the indicator device 130 and may provide the sensed motion data to the electronic device 110 through a connection (for example, a Bluetooth connection) with the electronic device 110. Based on this, the electronic device 110 may know the motions/movement of the indicator device 130, such as a movement direction and the like of the indicator device 130, by analyzing the motion data of the indicator device 130.

In embodiments of the disclosure, the processor 116 may access the modules and the codes recorded in the storage circuit 112 to implement the method for controlling the projection content proposed by the disclosure, and the details are as follows.

Figure 2:
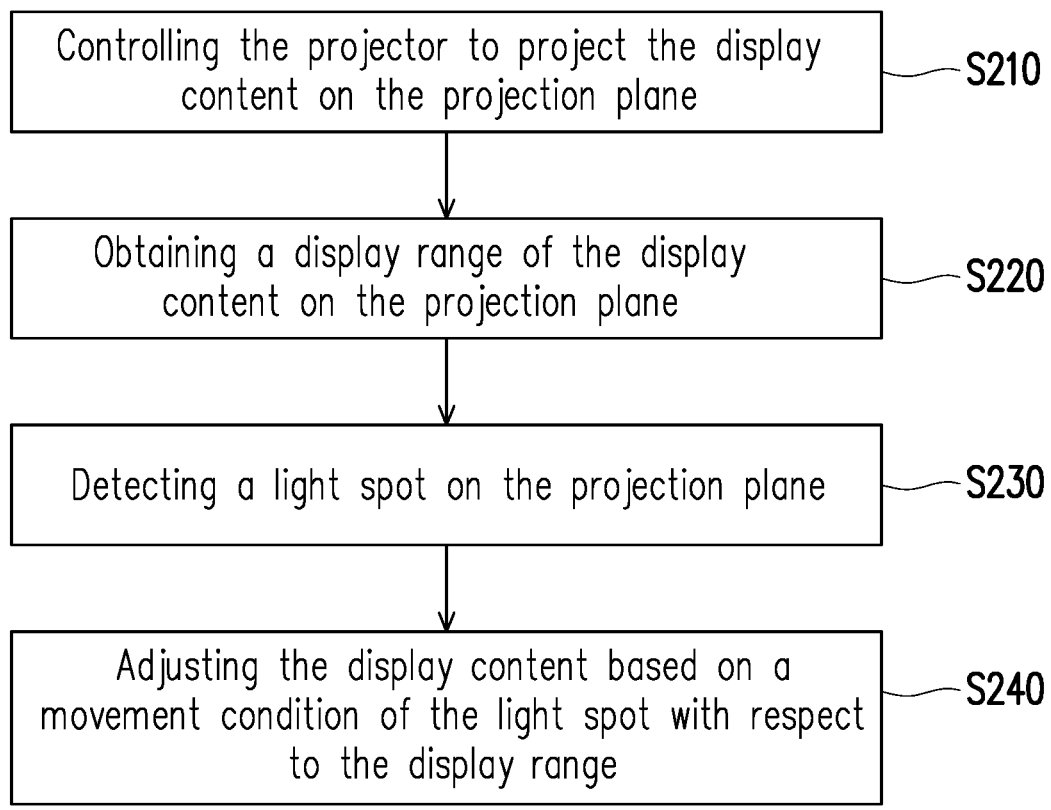
FIG. 2 is a flow chart of a method of controlling the projection content according to an embodiment of the disclosure.

Please refer to FIG. 2; FIG. 2 is a flow chart of a method of controlling the projection content according to an embodiment of the disclosure. The method of this embodiment may be performed by the electronic device 110 of FIG. 1A and FIG. 1B. The details of each step of FIG. 2 will be described below with reference to the contents shown in FIG. 1A and FIG. 1B.

Firstly, in step S210, the processor 116 may control the projector 120 to project the display content DC on the projection plane PL. In the scenario of FIG. 1B, the electronic device 110 is, for example, a personal computer and may provide the display content DC to the projector 120 (not shown in FIG. 1B) through the HDMI interface, so that the projector 120 projects the display content DC on the projection plane PL.

In step S220, the processor 116 may obtain a display range DR of the display content DC on the projection plane PL. In an embodiment, the processor 116 may control the projector 120 to project a plurality of anchor points AP in the display range DR of the display content DC. In this embodiment, each anchor point AP may be located at a corner of the display range DR, and the projector 120 may project each anchor point AP with use of visible light or invisible light, but the disclosure is not limited thereto. Then, the processor 116 may detect each anchor point AP through the detection circuit 114.

If the projector 120 is configured to project the anchor points AP into the display range DR by using infrared light, the processor 116 may correspondingly capture an infrared image of the projection plane PL through the detection circuit 114 (for example, an infrared camera). In this case, since it is assumed that the electronic device 110 is a personal computer, the detection circuit 114 may be disposed, for example, on the A part of the electronic device 110 for capturing an image of the projection plane PL, but the disclosure is not limited thereto. Thereafter, the processor 116 may obtain the anchor points AP from the infrared image and define the display range DR of the display content DC based thereon. In an embodiment, the processor 116 may, for example, perform a multi-point anchor operation based on the anchor points AP to determine the display range DR, but the disclosure is not limited thereto.

In step S230, the processor 116 may detect a light spot P1 on the projection plane PL. As described in the previous embodiments, since the indicator device 130 may emit the light spot P1 onto the projection plane PL by using invisible light such as infrared light, the light spot P1 may not be visually perceptible for the user. For convenience of description, hereinafter, it will be assumed that the indicator device 130 emits the light spot P1 onto the projection plane PL by infrared light, but the disclosure is not limited thereto.

In this case, the processor 116 may capture an infrared image of the projection plane PL through the detection circuit 114 (for example, an infrared camera) of the electronic device 110, and locate the light spot P1 in the infrared image. In various embodiments, the processor 116 may perform the above operations based on any associated infrared image recognition techniques, and details thereof are not described herein.

Next, in step S240, the processor 116 may adjust the display content DC based on a movement condition of the light spot P1 with respect to the display range DR.

In various embodiments, the mechanism by which the processor 116 adjusts the display content DC based on the movement condition of the light spot P1 with respect to the display range DR may be implemented in different manners, as will be described separately below.

In a first embodiment, in order to let the user know the current position of the light spot P1, the processor 116 may firstly determine whether the light spot P1 is located in the display range DR. If so, the processor 116 may obtain a light spot position of the light spot P1 in the display range DR and add an indicator symbol at an indicator position in the display content DC. In the first embodiment, relative positions of the light spot position and the display range DR may correspond to relative positions of the indicator position and the display content DC. In other words, in the case where the light spot P1 is invisible, the processor 116 may additionally provide/display an indicator symbol (for example, a dot) at the corresponding light spot position in the display content DC so that the user may know from the display content DC where the light spot P1 currently points. Taking FIG. 1B as an example, the user can observe the indicator symbol at the position of the light spot P1, but the indicator symbol is presented by the electronic device 110 by controlling the projector 120 to project the adjusted display content DC, instead of being emitted directly by the indicator device 130. In other embodiments, if the indicator device 130 projects the light spot P1 onto the projection plane PL by visible light (for example, laser light), the processor 116 may also perform the above operation to present the indicator symbol at the light spot position, but the disclosure is not limited thereto.

In a second embodiment, it is assumed that the display content DC corresponds to a file content having a plurality of pages (for example, a slide, a document and the like), and the electronic device 110 may, for example, allow the user to switch the page of the display content DC by swinging the indicator device 130. For example, the processor 116 may determine whether the light spot P1 is located in the display range DR. If the light spot P1 is not located in the display range DR and the motions of the indicator device 130 correspond to a page switching operation, the processor 116 may switch the page of the file content according to a movement direction of the indicator device 130.

If the processor 116 determines that the indicator device 130 has been swung in a first direction (for example, rightward/downward) based on motion data of the indicator device 130, the processor 116 may switch the file content to the next page accordingly. On the other hand, if the processor 116 determines that the indicator device 130 has been swung in a second direction (for example, leftward/upward) opposite to the first direction based on the motion data of the indicator device 130, the processor 116 may switch the file content to the previous page accordingly, but the disclosure is not limited thereto.

In the second embodiment, the processor 116 may switch the page of the file content according to the motions of the indicator device 130 only when the function button on the indicator device 130 has been triggered, but the disclosure is not limited thereto.

Figure 3A:
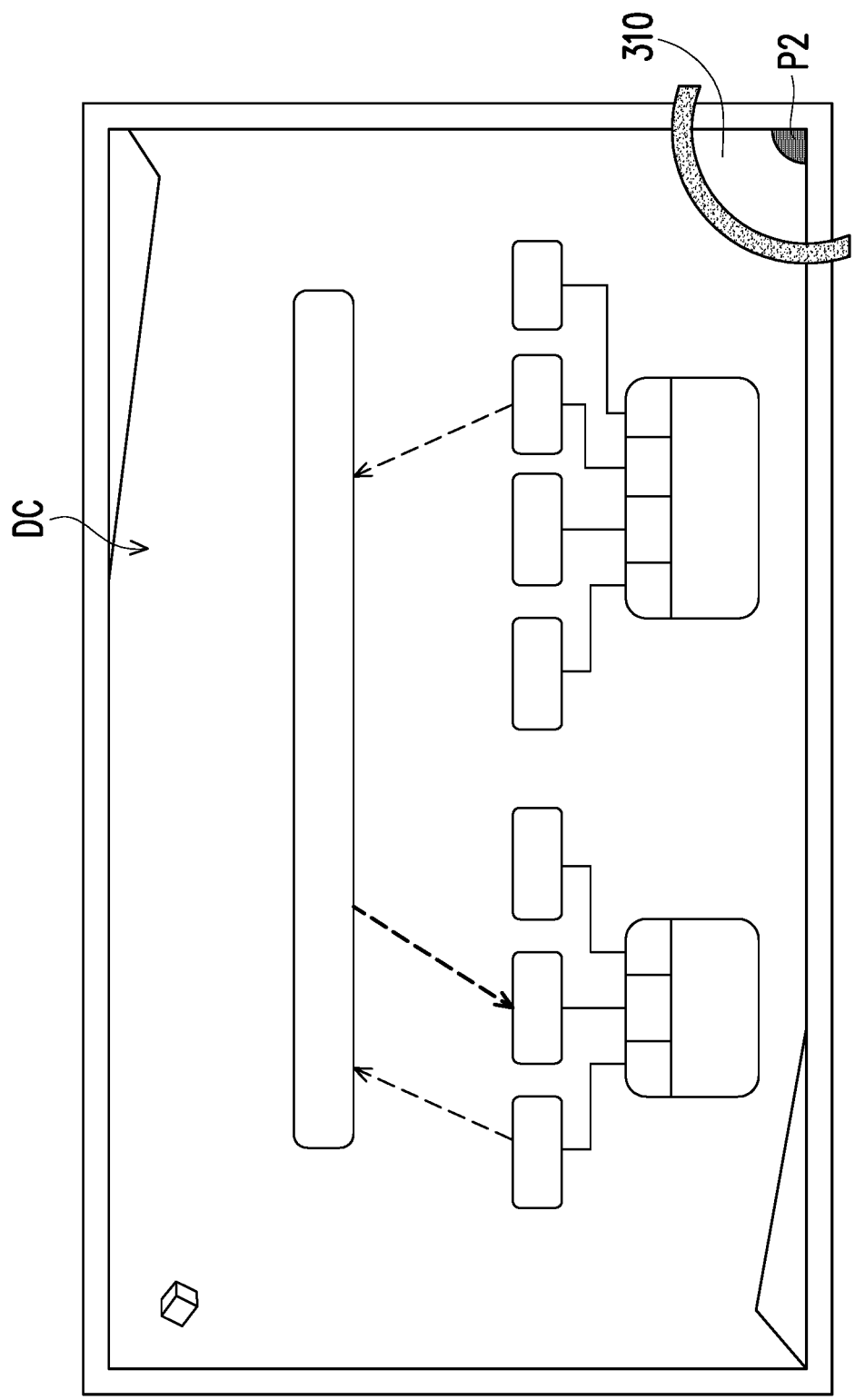
FIGS. 3A and 3B are schematic diagrams of an operation scenario according to the third embodiment of the disclosure.
Figure 3B:
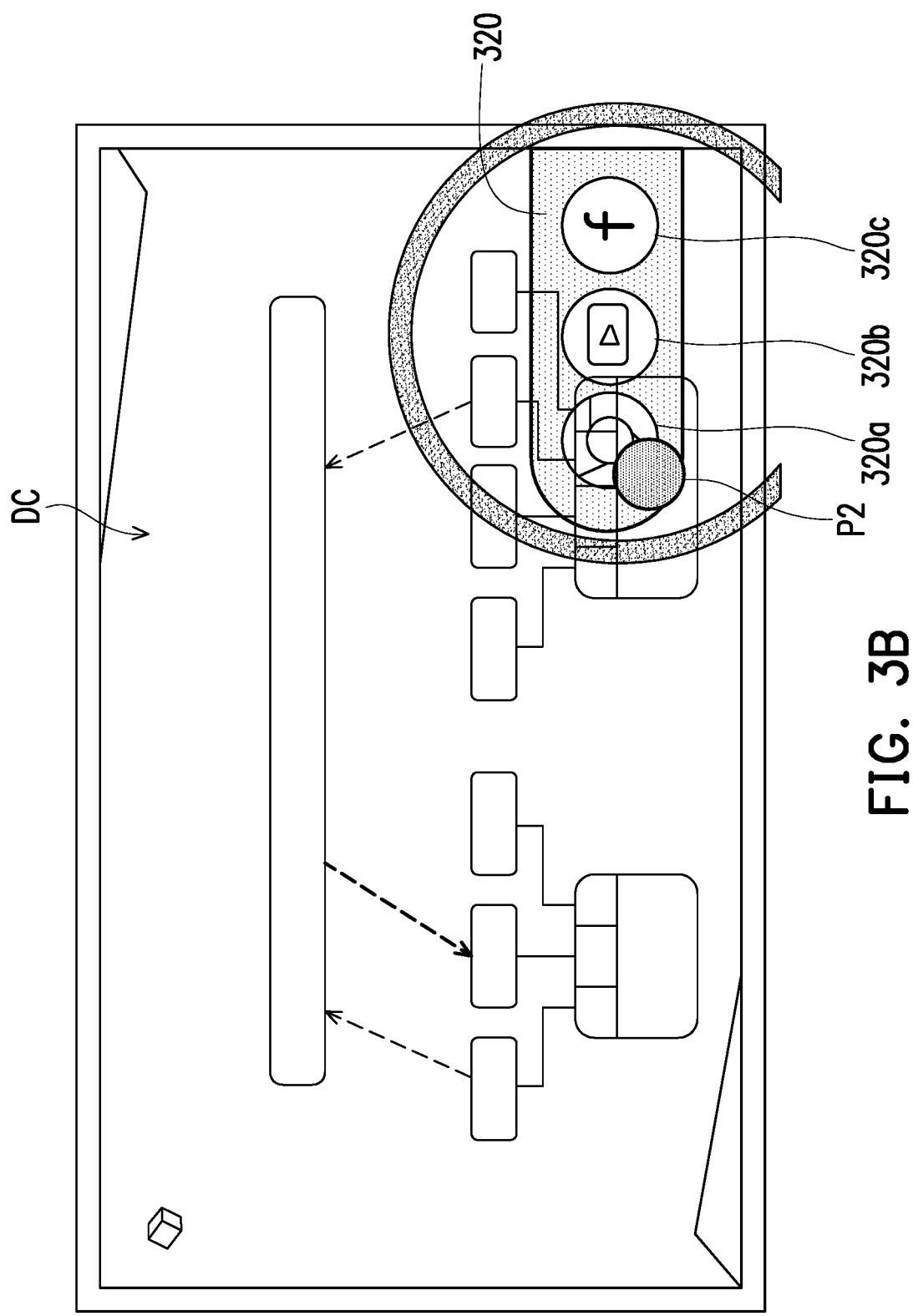

In a third embodiment, the display content DC may include a first specific area which may be configured to allow the user to trigger a specific function. Please refer to FIGS. 3A and 3B, wherein FIGS. 3A and 3B are schematic diagrams of an operation scenario according to the third embodiment of the disclosure. In the third embodiment, the display content DC may include a first specific area 310 (for example, a hidden area in the lower right corner), which may be configured to allow the user to move an indicator symbol P2 corresponding to the light spot P1 into it to trigger a specific function.

For example, in response to determining that the indicator symbol P2 has stayed in the first specific area 310 of the display content DC for a first predetermined time (for example, 2 seconds), the processor 116 may display a function menu 320 in the display content DC, as shown in FIG. 3B. In FIG. 3B, the function menu 320 may include a plurality of icons 320a, 320b and 320c corresponding to different specific functions. Next, in response to determining that one of the icons 320a, 320b and 320c is selected, the processor 116 may activate the corresponding specific function. If the icon 320a corresponds to a certain application (for example, a web browser), when the icon 320a is selected, the processor 116 may launch the application accordingly.

In different embodiments, the processor 116 may determine whether an icon is selected based on many different manners. Taking the icon 320a as an example, in response to determining that the indicator symbol P2 has stayed on the icon 320a for a second predetermined time (for example, 2 seconds), the processor 116 may determine that the icon 320a has been selected.

For another example, in response to determining that the indicator symbol P2 is located on the icon 320a and that the motions of the indicator device 130 correspond to a selection operation, the processor 116 may determine that the icon 320a has been selected. In an embodiment, if the processor 116 determines that the indicator device 130 has moved toward a specified direction (for example, forward) based on the motion data from the indicator device 130, the processor 116 may determine that the motions of the indicator device 130 correspond to the selection operation and launch the application corresponding to the icon 320a, but the disclosure is not limited thereto.

Figure 4:
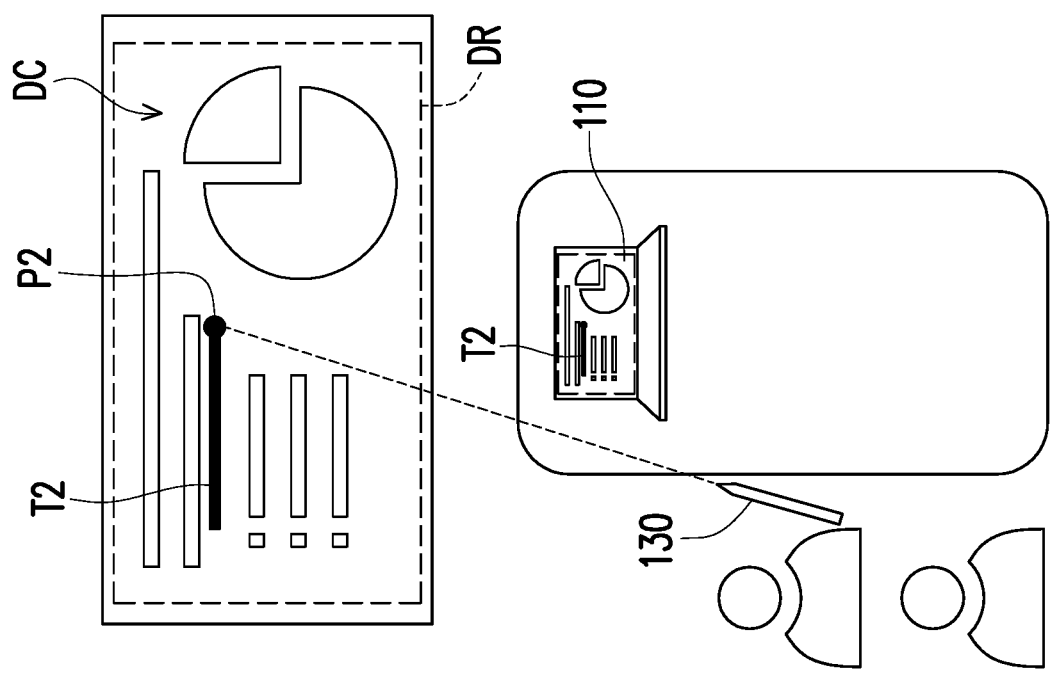
FIG. 4 is an operation scenario diagram according to the fourth embodiment of the disclosure.
Figure 4:
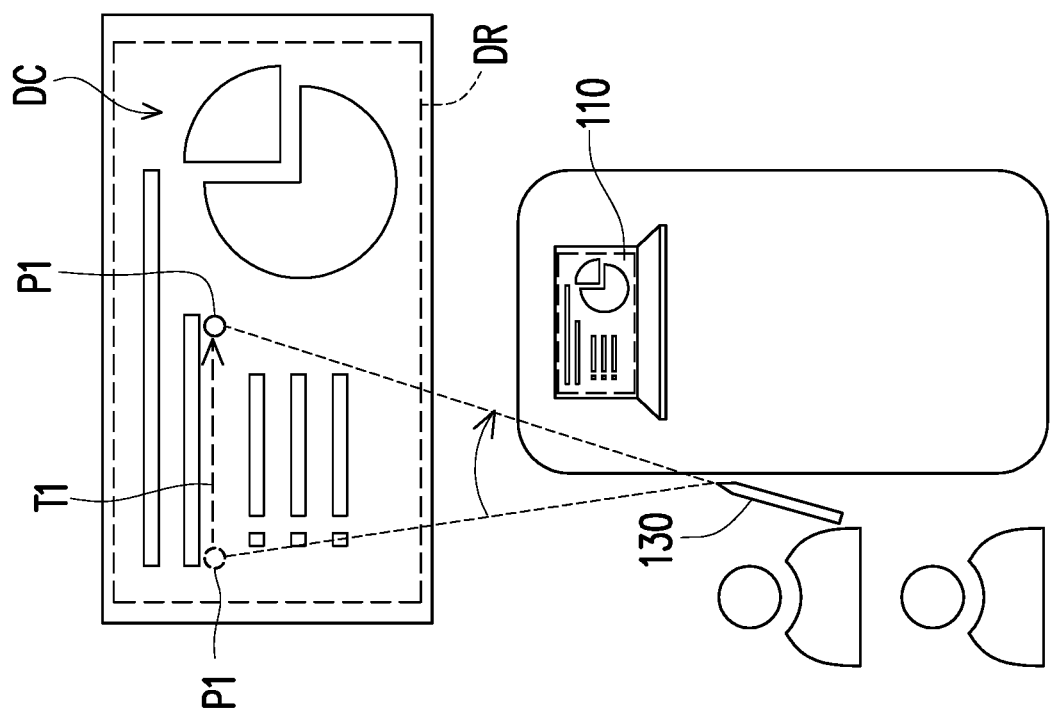

In a fourth embodiment, the electronic device 110 may, based on a light spot movement trace of the light spot P1 on the projection plane PL, present a corresponding indicator movement trace in the display content DC correspondingly. Please refer to FIG. 4, wherein FIG. 4 is an operation scenario diagram according to the fourth embodiment of the disclosure. In this embodiment, in response to determining that the light spot P1 is located in the display range DR and that a first triggering operation (for example, single clicking on a function button) occurs on the indicator device 130, the processor 116 may obtain a light spot movement trace T1 of the light spot P1 in the display range DR. Thereafter, the processor 116 may display an indicator movement trace T2 in the display content DC, and relative positions of the indicator movement trace T2 and the display content DC correspond to relative positions of the light spot movement trace T1 and the display range DR. In other words, after performing the first triggering operation on the indicator device 130, the user may make the display content DC present the corresponding trace by moving the light spot P1 in the display range DR. In this way, the user may easily perform operations such as scribing and marking on the display content DC. In light of the above, the method of the disclosure can improve the convenience of controlling and adjusting the projection content for the user.

Further to the fourth embodiment, in a fifth embodiment, the processor 116 may further perform a character recognition operation on the indicator movement trace T2 to determine whether the indicator movement trace T2 corresponds to one or more characters. In response to determining that the indicator movement trace T2 corresponds to one or more characters, the processor 116 may replace the indicator movement trace T2 in the display content DC with the above-described characters. On the other hand, if the indicator movement trace T2 does not correspond to any character, the processor 116 may maintain the indicator movement trace T2 in the display content DC. In light of the above, the user may input characters in addition to performing operations such as scribing and marking on the display content DC. In light of the above, the method of the disclosure can further improve the diversity of controlling and adjusting the projection content for the user.

Further, in a sixth embodiment, the electronic device 110 may adjust the size of the indicator symbol P2 based on the motions of the indicator device 130. Taking FIG. 4 as an example, when the display content DC includes the indicator symbol P2, the processor 116 may obtain a plurality motion data from the indicator device 130. In addition, in response to the motion data indicating that the indicator device 130 has moved toward a specific direction, the processor 116 may adjust the size of the indicator symbol P2 in the display content DC accordingly. For example, in response to determining that indicator device 130 has moved toward a first direction (for example, forward), the processor 116 may enlarge the indicator symbol P2. On the other hand, in response to determining that the indicator device 130 has moved toward a second direction (for example, backward), the processor 116 may shrink the indicator symbol P2, wherein the first direction may be opposite to the second direction. In light of the above, the disclosure may present different strokes in the display content DC by adjusting the size of the indicator symbol P2, thereby increasing the diversity in operation.

Figure 5:
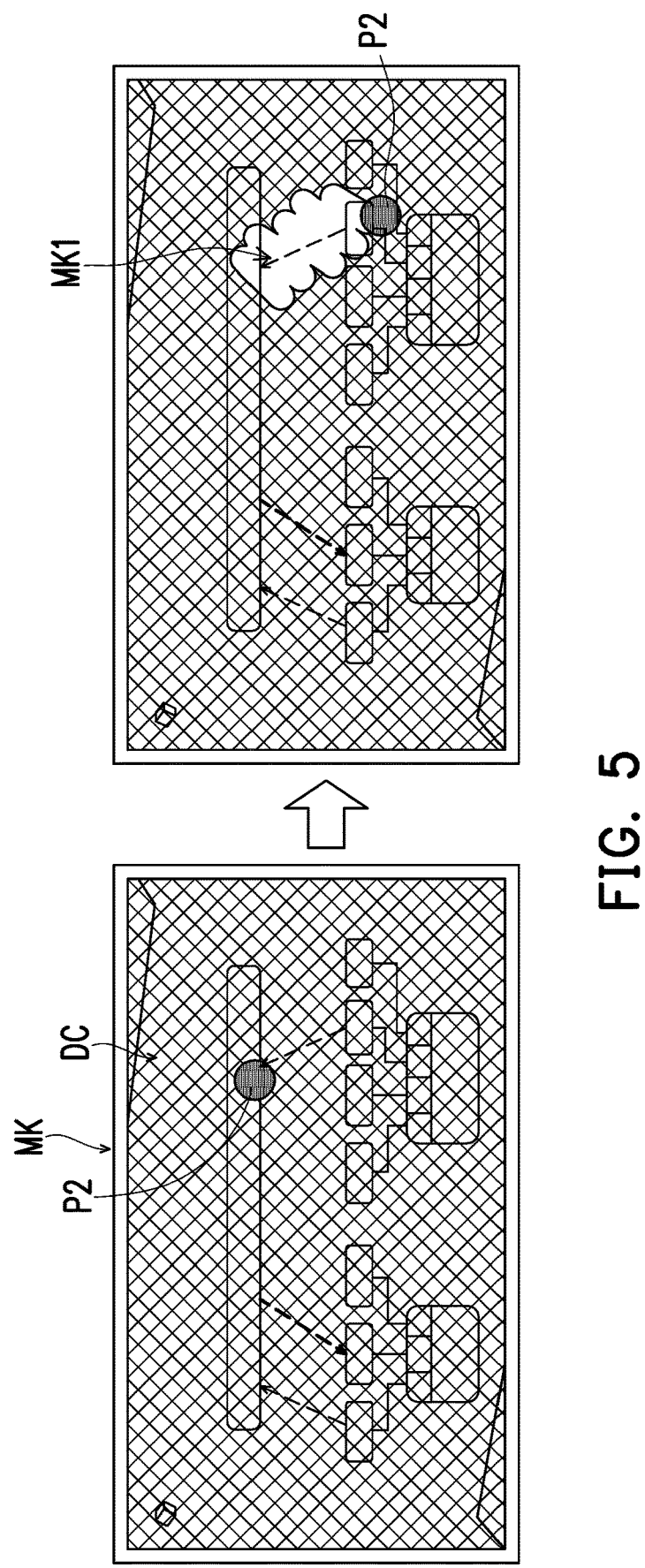
FIG. 5 is an operation scenario diagram according to the seventh embodiment of the disclosure.

In a seventh embodiment, the electronic device 110 may allow the user to determine a specific area to be emphasized by adjusting the presentation manner of the display content DC. Specifically, in response to determining that the light spot P1 is located in the display range DR and that a second triggering operation (for example, double clicking on a function button) occurs on the indicator device 130, the processor 116 may overlay a semi-transparent mask on the display content DC. Please refer to FIG. 5, wherein FIG. 5 is an operation scenario diagram according to the seventh embodiment of the disclosure. As shown in FIG. 5, the display content DC may be overlaid with a semi-transparent mask MK. In this case, the processor 116 may obtain the indicator movement trace of the indicator symbol P2 in the display content DC, and remove a specific portion MK1 of the semi-transparent mask MK corresponding to the indicator movement trace. As can be seen from FIG. 5, after the specific portion MK1 is removed, the display content DC at that place can be presented, thereby achieving the emphasis effect. Therefore, for the user, the user may determine the specific area to be emphasized by himself/herself, which therefore can allow the user to present the presentation content in a more flexible manner.

Further, in the seventh embodiment, in response to determining that a third triggering operation occurs on the indicator device 130, the processor 116 may completely remove the semi-transparent mask MK. That is, if the user wants to return the display content DC to the original display mode (for example, the mode in FIG. 3A), the user may cause the semi-transparent mask MK to disappear by performing the third triggering operation on the indicator device 130. In this embodiment, the third triggering operation may be a double click on a function button or other triggering modes set by the designer according to requirements.

In an embodiment, the above embodiments may be further integrated into a complete set of processes; however, this is merely for exemplification and is not intended to limit the possible embodiments of the disclosure.

Figure 6:
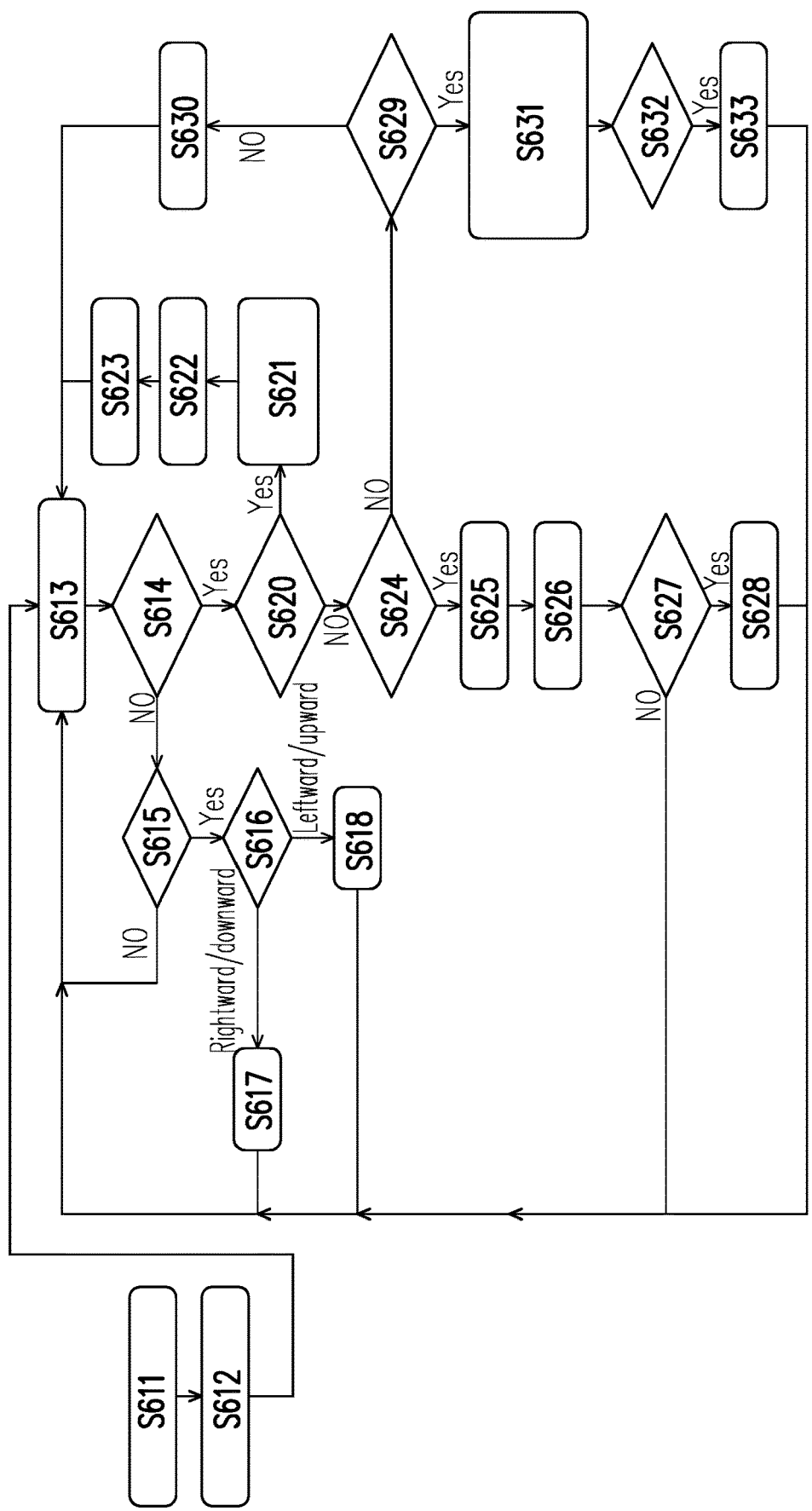
FIG. 6 is a flow chart according to the first to seventh embodiments of the disclosure.

Please refer to FIG. 6; FIG. 6 is a flow chart according to the first to seventh embodiments of the disclosure. First, in step S611, the processor 116 may control the projector 120 to project the display content DC on the projection plane PL. In step S612, the processor 116 may obtain the display range DR of the display content DC on the projection plane PL. In step S613, the processor 116 may detect the light spot P1 on the projection plane PL. In step S614, the processor 116 may determine whether the light spot P1 is located in the display range DR.

If the light spot P1 is not located in the display range DR, the processor 116 may determine in step S615 whether the function button of the indicator device 130 is triggered. If not, the processor 116 may return to step S613; otherwise, the processor 116 may proceed to step S616 to switch the page of the file content according to the movement direction of the indicator device 130. In this embodiment, if it is determined that the indicator device 130 moves rightward/downward, the processor 116 may perform step S617 to switch the file content to the next page. On the other hand, if it is determined that the indicator device 130 moves leftward/upward, the processor 116 may perform step S618 to switch the file content to the previous page.

In an embodiment, if the processor 116 determines in step S614 that the light spot P1 is located in the display range DR, the processor 116 may proceed to perform step S620 to determine whether the indicator symbol has stayed in the first specific area of the display content DC for the first predetermined time. If so, the processor 116 may perform step S621 to display a function menu in the display content DC. Next, in step S622, in response to an icon in the function menu being selected, the processor 116 may perform a specific function corresponding to the icon. Also, in step S623, the processor 116 may close the function menu and return to step S613.

In an embodiment, if the processor 116 determines in step S620 that the indicator symbol has not stayed in the first specific area of the display content DC for the first predetermined time, the processor 116 may proceed to perform step S624 to determine whether the first triggering operation (for example, single clicking on a function button) occurs on the indicator device 130. If so, the processor 116 may proceed to perform step S625 to present a corresponding indicator movement trace in the display content DC correspondingly based on the light spot movement trace of the light spot P1 on the projection plane PL. Next, in step S626, the processor 116 may adjust the size of the indicator symbol P2 based on the motions of the indicator device 130. Thereafter, in step S627, the processor 116 may determine whether the indicator movement trace corresponds to one or more characters. If so, the processor 116 may replace the indicator movement trace with the characters; otherwise, the processor 116 may return to step S613.

In an embodiment, if the processor 116 determines in step S624 that the first triggering operation does not occur on the indicator device 130, the processor 116 may proceed to step S629 to determine whether the second triggering operation (for example, double clicking on a function button) occurs on the indicator device 130. If not, the processor 116 may perform step S630 to add an indicator symbol to the indicator position in the display content DC, and then return to step S613.

On the other hand, if the processor 116 determines in step S629 that the second triggering operation occurs on the indicator device 130, the processor 116 may proceed to perform step S631 to overlay a semi-transparent mask on the display content DC and remove a specific portion of the semi-transparent mask corresponding to the indicator movement trace. Then, in step S632, the processor 116 may determine whether the third triggering operation occurs on the indicator device 130. If so, the processor 116 may completely remove the above-described semi-transparent mask and return to step S613; otherwise, the processor 116 may keep removing the specific portion of the semi-transparent mask corresponding to the indicator movement trace.

For details of the above steps, reference may be made to the descriptions in the first to seventh embodiments provided above, and details are not described herein.

In summary, the method for controlling the projection content and the electronic device proposed by the disclosure can adjust the display content according to the movement condition of the light spot after detecting the light spot projected by the indicator device onto the projection plane. In this way, the user can realize the functions of marking the display content, switching the page, inputting the characters, adjusting the stroke, and the like in real time by operating the indicator device. Moreover, the user can also open the function menu including the icons by moving the indicator symbol corresponding to the light spot to a specific area of the display content, and execute the corresponding specific function by selecting the icon. In addition, the user can also overlay a semi-transparent mask on the display content by operating the indicator device, and remove a specific portion in the semi-transparent mask by moving the indicator symbol, thereby emphasizing the specific area to be focused on. Based on the above, the disclosure can improve the convenience and diversity of controlling and adjusting the projection content for the user.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A method for controlling a projection content adapted for an electronic device, the method comprising:
   controlling a projector to project a display content on a projection plane;
   obtaining a display range of the display content on the projection plane;
   detecting a light spot on the projection plane, wherein the light spot is emitted by an indicator device to the projection plane, and the indicator device is paired with the electronic device; and
   adjusting the display content based on a movement condition of the light spot with respect to the display range, comprising:
      in response to determining that the light spot is located in the display range and that a first triggering operation occurs on the indicator device, obtaining a light spot movement trace of the light spot in the display range; and
      displaying an indicator movement trace in the display content, wherein relative positions of the indicator movement trace and the display content correspond to relative positions of the light spot movement trace and the display range.

2. The method according to claim 1, wherein the light spot is an infrared light spot, and the step of detecting the light spot on the projection plane comprises:
   capturing an infrared image of the projection plane by an infrared camera of the electronic device; and
   locating the light spot in the infrared image.

3. The method according to claim 1, wherein the step of adjusting the display content based on the movement condition of the light spot with respect to the display range comprises:
   in response to determining that the light spot is located in the display range, obtaining a light spot position of the light spot in the display range; and
   displaying an indicator symbol at an indicator position in the display content, wherein relative positions of the light spot position and the display range correspond to relative positions of the indicator position and the display content.

4. The method according to claim 1, wherein the display content corresponds to a file content, and the step of adjusting the display content based on the movement condition of the light spot with respect to the display range comprises:
   in response to determining that the light spot is not located in the display range and a motion of the indicator device corresponds to a page switching operation, switching a page of the file content according to a movement direction of the indicator device.

5. The method according to claim 1, wherein the display content comprises a first specific area and an indicator symbol corresponding to the light spot, and the step of adjusting the display content based on the movement condition of the light spot with respect to the display range comprises:
   in response to determining that the indicator symbol has stayed in the first specific area of the display content for a first predetermined time, displaying a function menu in the display content, wherein the function menu comprises an icon corresponding to a specific function; and
   in response to the icon being selected, activating the specific function.

6. The method according to claim 5, wherein in response to determining that the indicator symbol has stayed on the icon for a second predetermined time, determining that the icon has been selected.

7. The method according to claim 5, wherein in response to determining that the indicator symbol is located on the icon and a motion of the indicator device corresponds to a selection operation, determining that the icon has been selected.

8. The method according to claim 7, wherein the electronic device receives a plurality motion data from the indicator device, and in response to the plurality motion data indicating that the indicator device has moved toward a specified direction, determining that the motion of the indicator device corresponds to the selection operation.

9. The method according to claim 1, further comprising:
   performing a character recognition operation on the indicator movement trace to determine whether the indicator movement trace corresponds to at least one character; and
   in response to determining that the indicator movement trace corresponds to the at least one character, replacing the indicator movement trace in the display content with the at least one character.

10. The method according to claim 1, wherein the display content comprises an indicator symbol corresponding to the light spot, and the method further comprises:
    obtaining a plurality motion data from the indicator device; and
    in response to the plurality motion data indicating that the indicator device has moved toward a specific direction, adjusting a size of the indicator symbol accordingly.

11. The method according to claim 10, wherein
    in response to determining that indicator device has moved toward a first direction, enlarging the indicator symbol; and
    in response to determining that indicator device has moved toward a second direction, shrinking the indicator symbol, wherein the first direction is opposite to the second direction.

12. The method according to claim 1, wherein the display content comprises an indicator symbol corresponding to the light spot, and the step of adjusting the display content based on the movement condition of the light spot with respect to the display range comprises:
    in response to determining that the light spot is located in the display range and a second triggering operation occurs on the indicator device, overlaying a semi-transparent mask on the display content;
    obtaining an indicator movement trace of the indicator symbol in the display content; and
    removing a specific portion of the semi-transparent mask corresponding to the indicator movement trace.

13. The method according to claim 12, wherein in response to determining that a third triggering operation occurs on the indicator device, removing the semi-transparent mask completely.

14. The method according to claim 1, wherein the light spot is an infrared light spot, and the step of obtaining the display range of the display content on the projection plane comprises:
    controlling the projector to project a plurality of anchor points in the display range of the display content, wherein each of the plurality of anchor points is located at a corner of the display range;
    capturing an infrared image of the projection plane by an infrared camera of the electronic device; and
    obtaining the plurality of anchor points from the infrared image and accordingly defining the display range of the display content based thereon.

15. An electronic device associated with an indicator device, comprising:
- a light spot detection circuit;
- a non-transitory storage circuit for storing a plurality of modules; and
- a processor coupled to the storage circuit and accessing the plurality of modules to perform following steps:
  - controlling a projector to project a display content on a projection plane;
  - obtaining a display range of the display content on the projection plane;
  - detecting, with the light spot detection circuit, a light spot on the projection plane, wherein the light spot is emitted by an indicator device to the projection plane, and the indicator device is paired with the electronic device; and
  - adjusting the display content based on a movement condition of the light spot with respect to the display range, comprising:
    - in response to determining that the light spot is located in the display range and that a first triggering operation occurs on the indicator device, obtaining a light spot movement trace of the light spot in the display range; and
    - displaying an indicator movement trace in the display content, wherein relative positions of the indicator movement trace and the display content correspond to relative positions of the light spot movement trace and the display range.

* * * * *